United States Patent
Choi

(10) Patent No.: US 6,469,922 B2
(45) Date of Patent: Oct. 22, 2002

(54) METHOD AND APPARATUS FOR CONTROLLING MINIMUM BRIGHTNESS OF A FLOURESCENT LAMP

(75) Inventor: Hwangsoo Choi, Fullerton, CA (US)

(73) Assignee: Linfinity Microelectronics, Irvine, CA (US)

(*) Notice: Subject to any disclaimer, the term of this patent is extended or adjusted under 35 U.S.C. 154(b) by 0 days.

(21) Appl. No.: 09/946,856

(22) Filed: Sep. 4, 2001

(65) Prior Publication Data

US 2002/0031002 A1 Mar. 14, 2002

Related U.S. Application Data

(63) Continuation of application No. 09/599,625, filed on Jun. 22, 2000, now Pat. No. 6,307,765.

(51) Int. Cl.$^7$ .............................................. H02M 7/538
(52) U.S. Cl. ................................ 363/134; 315/DIG. 4
(58) Field of Search ............................ 363/16, 24, 25, 363/133, 134; 315/209 R, 219, 221, 223, 224, 227 R, 240, DIG. 4

(56) References Cited

U.S. PATENT DOCUMENTS

| | | |
|---|---|---|
| 5,235,254 A | 8/1993 | Ho |
| 5,420,779 A | 5/1995 | Payne |
| 5,430,641 A | 7/1995 | Kates |
| 5,548,189 A | 8/1996 | Williams |
| 5,619,402 A | 4/1997 | Liu |
| 5,705,877 A | 1/1998 | Shimada |
| 5,796,213 A | 8/1998 | Kawasaki |
| 5,844,540 A * | 12/1998 | Terasaki ...................... 345/102 |
| 5,854,617 A | 12/1998 | Lee et al. |
| 5,859,489 A | 1/1999 | Shimada |
| 5,880,946 A | 3/1999 | Biegel |
| 5,886,477 A | 3/1999 | Honbo et al. |
| 5,923,546 A | 7/1999 | Shimada et al. |
| 5,925,988 A | 7/1999 | Grave et al. |
| 5,939,830 A | 8/1999 | Praiswater |
| 6,011,360 A | 1/2000 | Gradzki et al. |
| 6,194,841 B1 * | 2/2001 | Takahasi et al. ............. 315/224 |
| 6,229,271 B1 * | 5/2001 | Liu ............................. 315/291 |
| 6,259,215 B1 * | 7/2001 | Roman ........................ 315/307 |

* cited by examiner

Primary Examiner—Matthew Nguyen
(74) Attorney, Agent, or Firm—Knobbe, Martens, Olson, and Bear LLP

(57) ABSTRACT

An efficient power conversion circuit for driving a fluorescent lamp uses a minimum pulse generator circuit to control the minimum on-time of a time modulated signal to increase the dimming range of the fluorescent lamp operating over a wide range of temperature and supply voltage. A minimum number of lamp current cycles with respective amplitudes above a preset threshold is typically required to avoid flickering or shimmering during minimum brightness. The minimum pulse generator circuit counts the lamp current cycles and adjusts the on-time accordingly to guarantee the minimum number of cycles with respective amplitudes above a preset threshold under all operating conditions.

6 Claims, 5 Drawing Sheets

METHOD AND APPARATUS FOR CONTROLLING MINIMUM BRIGHTNESS OF A FLOURESCENT LAMP

This application is a continuation of U.S. patent application Ser. No. 09/599,625 filed on Jun. 22, 2000, now U.S. Pat. No. 6,307,765

BACKGROUND OF THE INVENTION

1. Field of the Invention

This present invention relates to a power conversion circuit for driving fluorescent lamps, and, more particularly, relates to circuitry in the power conversion circuit which controls the minimum brightness of the fluorescent lamps.

2. Description of the Related Art

Fluorescent lamps are used in a number of applications where light is required but the power required to generate light is limited. One particular type of fluorescent lamp is a cold cathode fluorescent lamp (CCFL). CCFLs are used for back or edge lighting of liquid crystal displays (LCDs) which are typically used in notebook computers, web browsers, automotive and industrial instrumentation, and entertainment systems.

CCFL tubes typically contain a gas, such as Argon, Xenon, or the like, along with a small amount of Mercury. After an initial ignition stage and the formation of plasma, current flows through the tube which results in the generation of ultraviolet light. The ultraviolet light in turn strikes a phosphoric material coated in the inner wall of the tube, resulting in visible light.

A power conversion circuit is used for driving the CCFL. The power conversion circuit accepts a direct current (DC) supply voltage and provides a substantially sinusoidal output voltage to the CCFL. The brightness of the CCFL is controlled by controlling the current (i.e., lamp current) through the CCFL. The lamp current can be amplitude modulated or time modulated for dimming control of the CCFL. Time modulation typically offers a wider dimming range.

The lamp current is time modulated by selectively turning off the sinusoidal output voltage provided to the CCFL for varying time durations. For example, the sinusoidal output voltage alternates between being on for Tx seconds and being off for Ty seconds. The period (i.e., summation of Tx and Ty) is generally fixed in constant frequency operation to reduce electro-magnetic-field (EMF) interference with other devices. The on-time duty cycle (i.e., Tx/(Tx+Ty)) determines the brightness of the CCFL. Maximum brightness results when the sinusoidal output voltage is on all the time with a 100% duty cycle (i.e., Ty=0). Minimum brightness results when the duty cycle is small (i.e., Ty>>Tx).

A wide dimming range is desirable for efficient operation of the CCFL. The dimming range of the CCFL is generally limited by the minimum brightness that can be achieved without flickering or shimmering. To achieve minimum brightness without flickering or shimmering, the on-time of the sinusoidal output voltage needs to be the minimum time possible to produce a lamp current with a minimum number of cycles with respective amplitudes above a preset threshold.

Each lamp current cycle corresponds to a respective cycle of the sinusoidal output voltage. Ideally, each cycle of the sinusoidal output voltage produces a lamp current cycle with a respective amplitude above the threshold. However, lamp characteristics, LCD mechanical structure, operating temperature and supply voltage variations can cause the amplitudes of some of the initial lamp current cycles to fall below the threshold, thereby causing flickering or shimmering.

Prior art systems set the minimum on-time of the sinusoidal output voltage to a sufficiently long time such that the number of lamp current cycles with respective amplitudes above the threshold is equal to or greater than the required minimum number under all operating conditions. Under most conditions, the CCFL is operating above the minimum brightness with the minimum on-time setting to avoid undesired flickering or shimmering. The dimming range of the CCFL is effectively limited.

SUMMARY OF THE INVENTION

The present invention solves these and other problems by providing a minimum pulse generator circuit to control the minimum on-time of a time modulated signal to increase the dimming range of a CCFL. The minimum pulse generator circuit counts lamp current cycles and adjusts the on-time accordingly to guarantee a minimum number of cycles with respective amplitudes above a preset threshold under all operating conditions.

For example, if a user determines that six cycles with respective amplitudes above the threshold are required to achieve minimum brightness without flickering or shimmering for the CCFL, the minimum on-time is initially set to correspond to six cycles of a sinusoidal output voltage provided to the CCFL. The lamp current (i.e., current flowing through the CCFL) is sensed on a lamp return line. Lamp current cycles with respective amplitudes above the threshold are counted, and the on-time is lengthened as necessary to achieve at least six lamp current cycles with respective amplitudes above the threshold.

The minimum pulse generator circuit is part of a controller in a power conversion circuit for driving the CCFL. The controller generates signals with active states and inactive states corresponding respectively to the on-times and the off-times of the CCFL. The durations of the respective active states are equal to or greater than a minimum duration determined by the minimum pulse generator circuit which counts cycles of current flowing through the CCFL with respective amplitudes above a preset threshold. One or more control signals are provided to the controller indicating a control value for comparison with a value representing the cycles counted by the minimum pulse generator circuit.

The controller generally includes a dimming control circuit, a pulse width modulation circuit, and an oscillator circuit. The oscillator circuit provides synchronized fixed frequency signals (or some multiple thereof) for signal generation. The pulse width modulation circuit provides a time modulated signal which is the output of the controller. The dimming control circuit includes a pulse generator circuit and the minimum pulse generator circuit.

The pulse generator circuit is configured to determine an initial duration for the active states (i.e., on-times of the CCFL). The minimum pulse generator circuit is configured to determine the minimum duration for the active states. A logic gate is configured to output a signal to the pulse width modulation circuit with a duty cycle corresponding to a greater of the initial duration duty cycle and the minimum duration duty cycle. In one embodiment, the logic gate is an OR-gate.

The minimum pulse generator circuit includes a differential amplifier, a counter, and a comparator. The differential amplifier produces a pulse when a voltage representative of the current flowing through the CCFL transitions from below a reference voltage to above the reference voltage. The pulse advances a count in the counter. The current value of the count and the control value are compared by the comparator. The comparator determines when the current value of the count equals or exceeds the control value.

In one embodiment, the control value is communicated via control signals and is stored in a memory element of the minimum pulse generator circuit. The differential amplifier includes internal hysteresis. The counter is an n-bits binary counter which resets periodically. The comparator is an n-bits digital comparator.

DETAILED DESCRIPTION OF THE INVENTION

Figure 1:
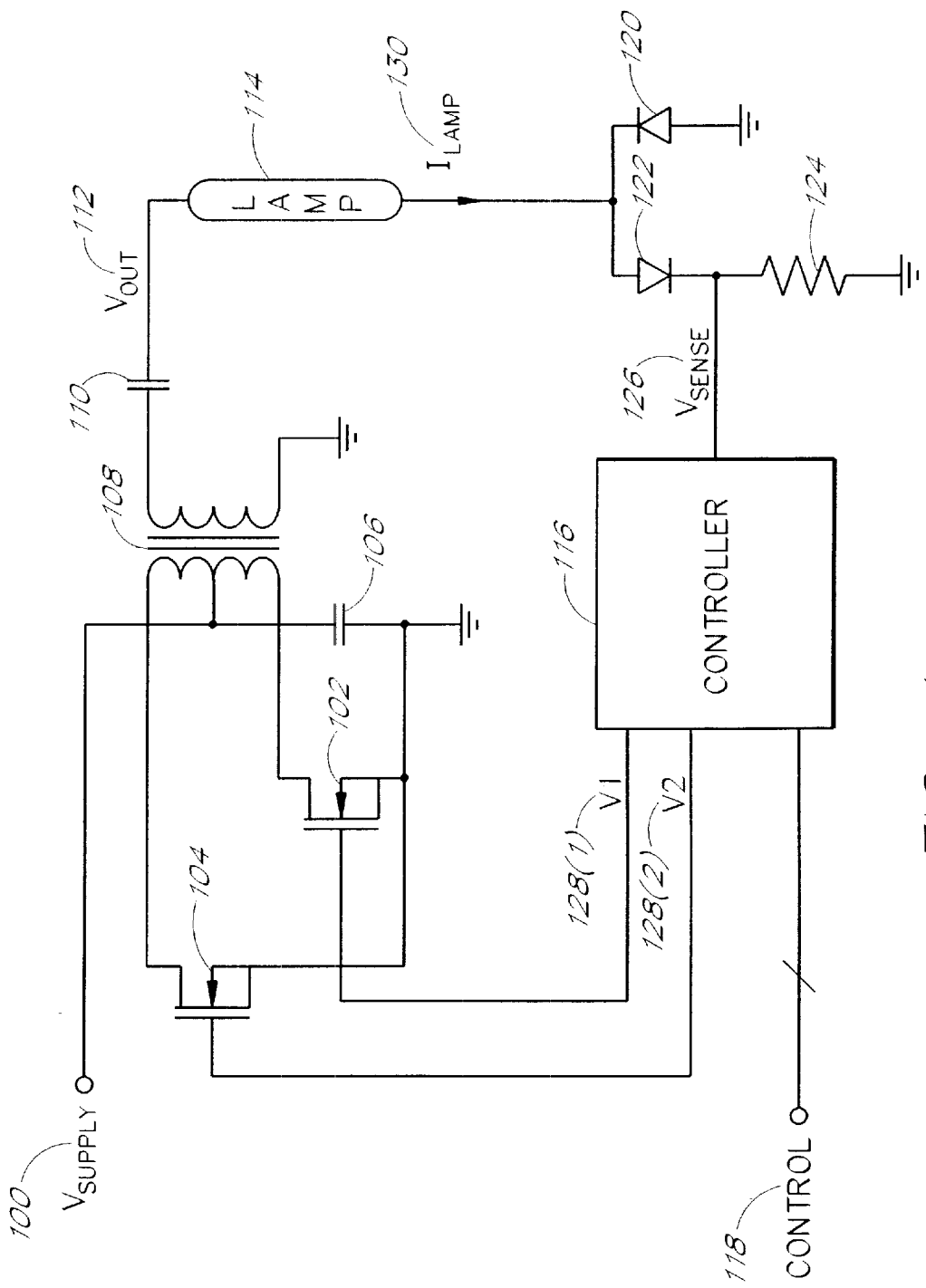
FIG. 1 is a schematic diagram of a power conversion circuit according to one embodiment of the present invention.

FIG. 1 is a schematic diagram of a power conversion circuit according to one embodiment of the present invention. The power conversion circuit converts a DC supply voltage (VSUPPLY) 100 into a substantially sinusoidal output voltage (VOUT) 112 to drive a cold cathode fluorescent lamp (CCFL) 114. The supply voltage 100 is provided to a center tap of the primary winding of a transformer 108. An input capacitor 106 is coupled between the supply voltage 100 and ground. The drain terminals of respective field-effect-transistors (FETs) 102, 104 are coupled to respective opposite terminals of the center-tapped primary winding of the transformer 108. The source terminals of the FETs 102, 104 are connected to ground. One of the output terminals of the secondary winding of the transformer 108 is connected to ground while the other output terminal is provided to the first terminal of a capacitor 110. The second terminal of the capacitor 110 is coupled to the input of the CCFL 114.

A lamp current (ILAMP) 130, indicative of the current passing through the CCFL 114, on a return line of the CCFL 114 is provided to the cathode and anode of respective diodes 120, 122. The anode of the diode 120 is connected to ground. The cathode of the diode 122 is coupled to the first terminal of a resistor 124. The second terminal of the resistor 124 is connected to ground. A sense voltage (VSENSE) 126 across the resistor 124 is provided to a controller 116. One or more control signals (CONTROL) 118 are provided to the controller 116. The controller 116 provides rspective switching signals V1 128(1) and V2 128(2) to the gate terminals of the FETs 102, 104.

The FETs 102, 104 function as switches. The controller 116 controls the FETs 102, 104 such that a square wave voltage signal results across the primary winding of the transformer 108. The inductance of the transformer 108 is sufficiently high such that the voltage across the secondary winding of the transformer 108 is sinusoidal. Thus, the output voltage 112 provided to the CCFL 114 is sinusoidal, and the corresponding sinusoidal lamp current 130 passes through the CCFL 114 to illuminate the CCFL 114. The capacitor 110 prevents DC current from flowing through the CCFL 114 which can shorten the life of the CCFL 114.

The diode 122 operates as a half-wave rectifier such the sense voltage 126 develops across the resistor 124 responsive to the lamp current 130 passing through the CCFL 114 in one direction. The diode 120 provides a current path for the alternate half-cycles when the lamp current 130 flows in another direction.

The lamp current 130 provides an indication of the intensity of light (i.e., brightness) of the CCFL 114. The controller 116 adjusts the lamp current 130 based on the sense voltage 126 and the control signals 118. In one embodiment, the controller 116 controls the current passing through the CCFL 114 by pulse width modulating the switching signals 128(1), 128(2) provided to the gate terminals of the respective FETs 102, 104. For example, both FETs 102, 104 are turned off periodically, and the output voltage 112 provided to the CCFL 114 is characterized by periodic pulses of sinusoidal waveforms. The average lamp current decreases with shorter pulses, thereby dimming the CCFL 114.

Figure 2:
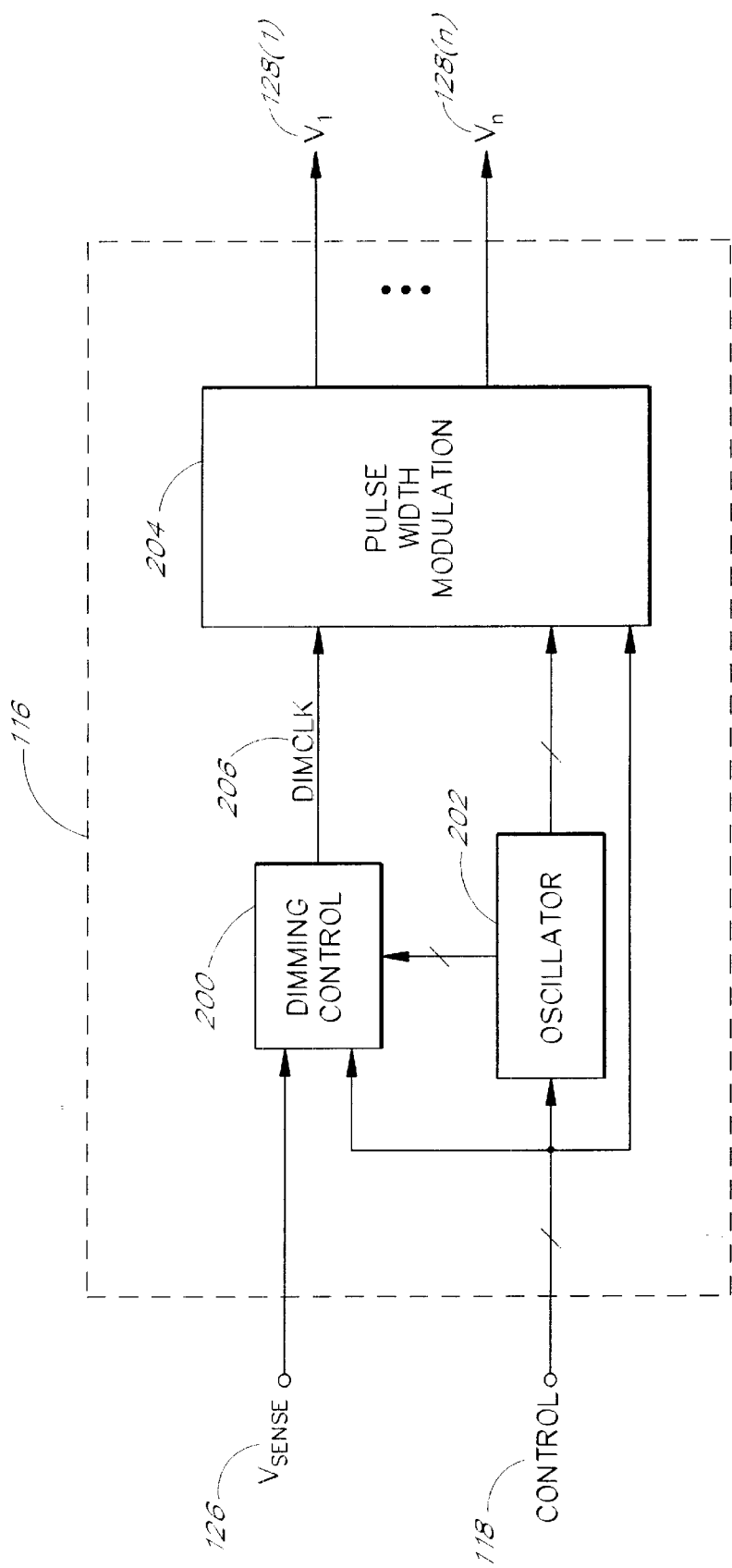
FIG. 2 is a block diagram of one embodiment of the controller shown in FIG. 1.

FIG. 2 is a block diagram of one embodiment of the controller 116 shown in FIG. 1. In one embodiment, the controller 116 is an integrated circuit. The controller 116 includes a dimming control circuit 200, an oscillator circuit 202, and a pulse width modulation (PWM) circuit 204. One or more of the control signals 118 are provided to each of the circuits 200, 202, 204. The sense voltage 126 is provided to the dimming control circuit 200. The oscillator circuit 202 provides one or more signals to the dimming control circuit 200 and the PWM circuit 204. The dimming circuit 200 provides a pulse duration signal (DIMCLK) 206 to the PWM circuit 204. The PWM circuit 204 provides n control voltage signals (V1–Vn) shown as switching signals 128(1)–128(n) (collectively the switching signals 128).

In one embodiment, the control signals 118 are provided to the dimming control circuit 200, the oscillator circuit 202, and the PWM circuit 204 on dedicated signal paths. In an alternate embodiment, the control signals 118 are provided on a shared bus. One or more memory elements (not shown) capture the control signals 118 for later use. Addresses on the shared bus ensure that the memory elements capture the respective intended control signals 118. The control signals 118 are generally provided by a microprocessor (not shown) which controls other circuits (not shown) in addition to the power conversion circuit.

The oscillator circuit 202 typically provides one or more fixed frequency signals (or some multiple thereof) to the dimming control circuit 200 and the PWM circuit 204. Fixed frequency operation reduces EMF interference with the other circuits. The frequency of oscillation can be set by the control signals 118 or external components (not shown), such as resistors or capacitors. The fixed frequency signals are used for synchronization and signal generation in the controller 116.

The PWM circuit 204 typically modulates the duty cycle of one of the signals from the oscillator circuit 202 to generate the switching signals 128. The pulse duration signal 206 from the dimming control circuit 200 determines the actual on-time of the CCFL 114 and determines the pulse width of the modulation.

Figure 3:
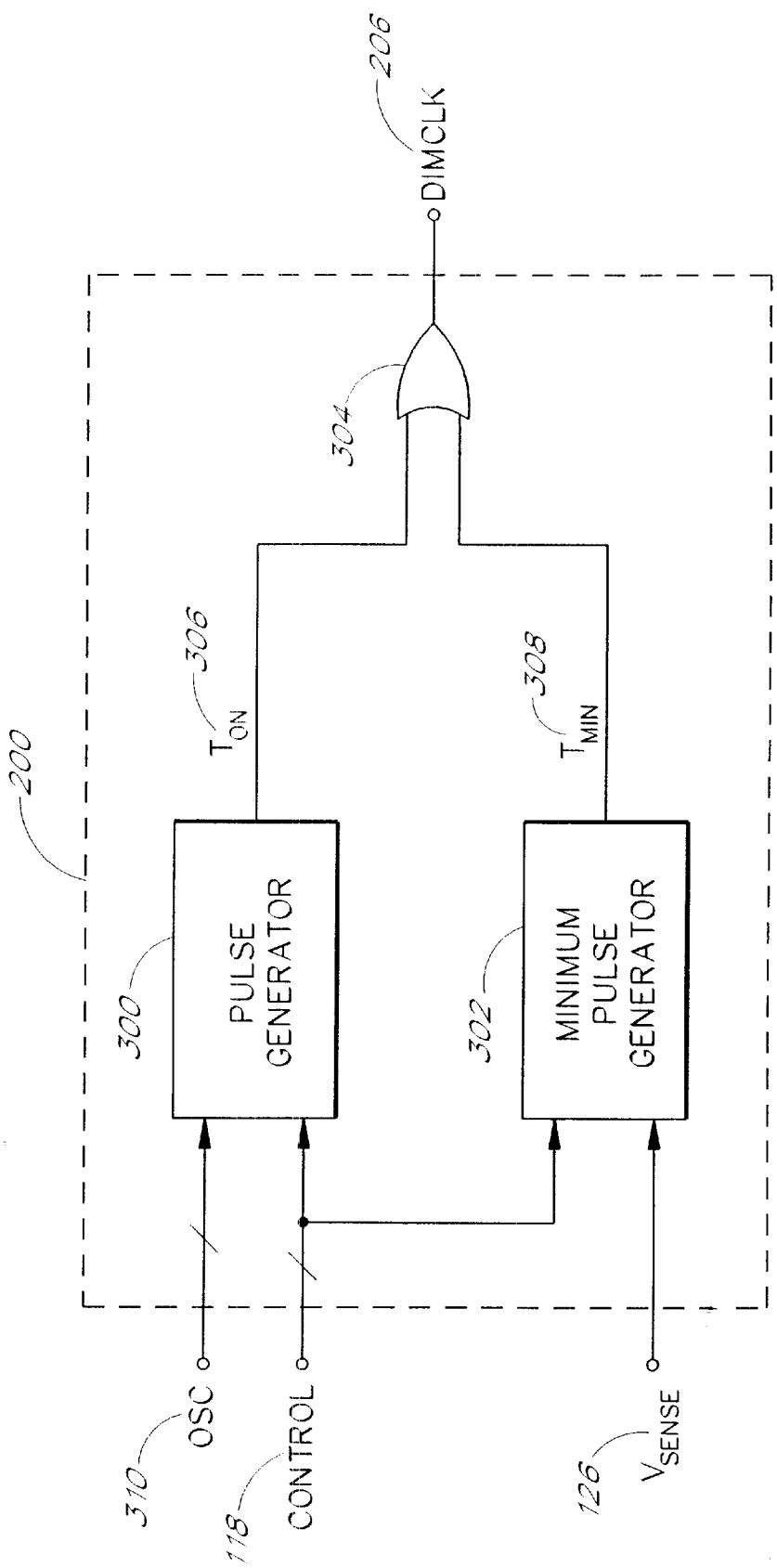
FIG. 3 is a block diagram of one embodiment of the dimming control circuit shown in FIG. 2.

FIG. 3 is a block diagram of one embodiment of the dimming control circuit 200 shown in FIG. 2. The dimming control circuit 200 includes a pulse generator circuit 300 and a minimum pulse generator circuit 302. The control signals 118 are provided to both circuits 300, 302. One or more fixed frequency signals (OSC) 310 from the oscillator circuit 202 are provided to the pulse generator circuit 300. The sense voltage 126 is provided to the minimum pulse generator circuit 302. An output (TON) 306 of the pulse generator circuit 300 and an output (TMIN) 308 of the minimum pulse generator circuit 302 are provided to respective inputs of a logical gate 304. The output of the logical gate 304 is the output of the dimming control circuit 200 which is the pulse duration signal 206.

The pulse generator circuit 300 determines the initial on-time (i.e., TON) 306 of the CCFL 114 based on the desired dimming level. In one embodiment, the desired dimming level is communicated via the control signals 118. The minimum pulse generator circuit 302 determines the minimum on-time (i.e., TMIN) 308 that is required to avoid flickering. The logical gate 304 controls the operation of the PWM circuit 204 based on TON 306 and TMIN 308. In one embodiment, the logical gate 304 is an OR-gate. The pulse duration signal 206 at the output of the logical gate 304 is high when either TON 306 or TMIN 308 is high.

The dimming of the CCFL 114 is controlled by turning the CCFL 114 on and off periodically. When the pulse duration signal 206 is high, the PWM circuit 204 drives the CCFL 114 on at a preset level. When the pulse duration signal 206 is low, the PWM circuit 204 drives the CCFL 114 off. By controlling the duty cycle of the pulse duration signal 206, the CCFL 114 is turned on and turned off such that the effective brightness of the CCFL 114 is proportional to the duty cycle of the pulse duration signal 206. To avoid flickering, the pulse duration signal 206 is forced high until the minimum brightness is detected by the minimum pulse generator circuit 302 via the sense voltage 126.

Figure 4:
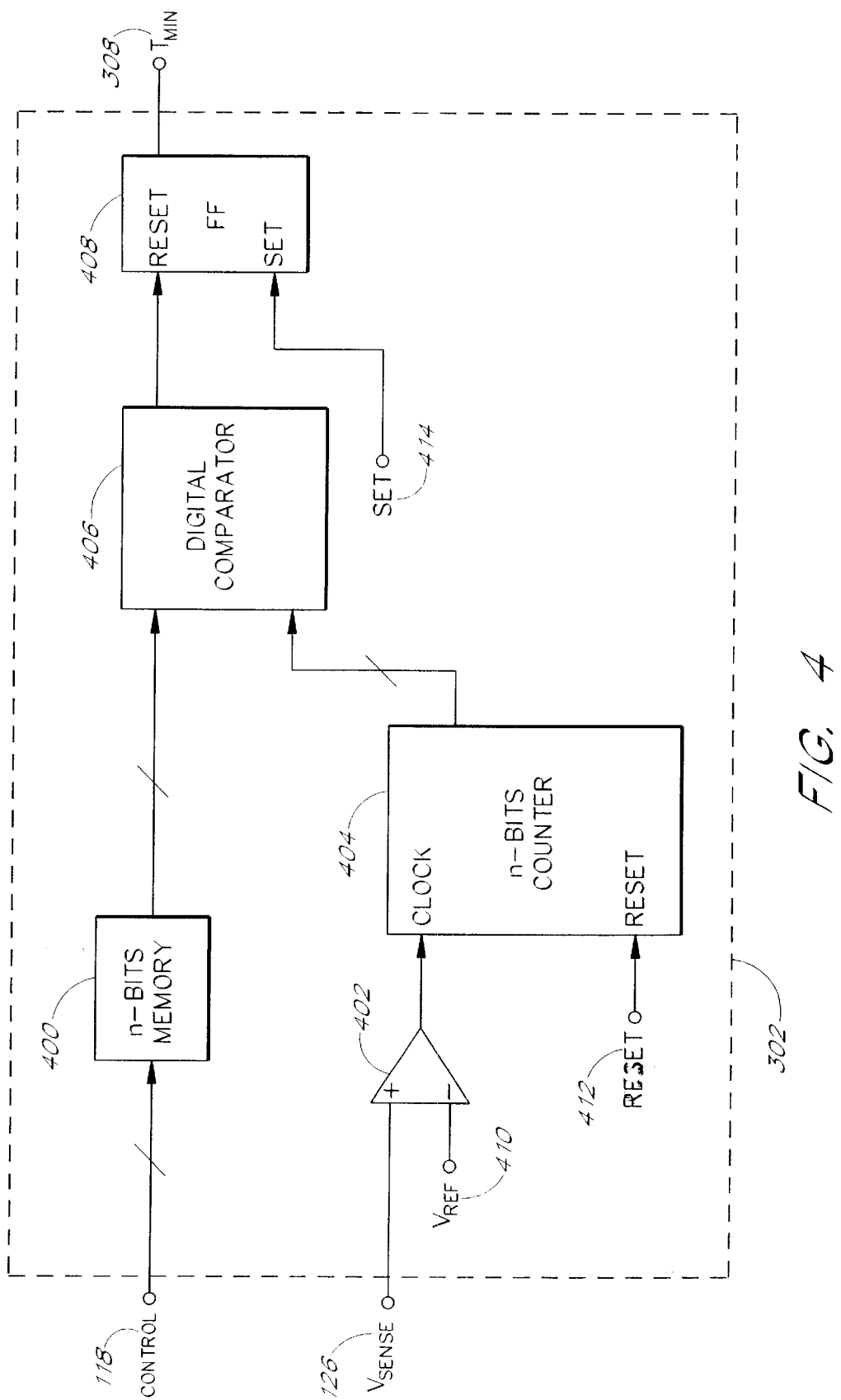
FIG. 4 is a schematic diagram of one embodiment of the minimum pulse generator circuit shown in FIG. 3.

The minimum pulse generator circuit 302 which controls the minimum duty cycle of the output voltage 112 provided to the CCFL 114 is illustrated in more detail in FIG. 4. FIG. 4 is a schematic diagram of one embodiment of the minimum pulse generator circuit 302 shown in FIG. 3. The minimum pulse generator circuit 302 includes a memory element 400, a differential amplifier 402, a counter 404, a comparator 406, and a flip-flop 408.

In one embodiment, the sense voltage 126 is provided to the non-inverting (+) input of the differential amplifier 402 and a reference voltage (VREF) 410 is provided to the inverting (−) input of the differential amplifier 402. The reference voltage 410 can be generated internally or can be provided from an external source. The differential amplifier 402 outputs a signal recognized as a logical high when the sense voltage 126 exceeds the reference voltage 410. In one embodiment, the differential amplifier 402 includes hysteresis to avoid false transitions caused by noise.

The output of the differential amplifier 402 is provided to the clock input of the counter 404. The counter 404 advances by one count each time the output of the differential amplifier 402 transitions to the logical high state. In one embodiment, the counter 404 is an n-bits binary counter and can be configured to either count up or count down.

In one embodiment, the control signals 118 corresponding to the minimum number of cycles for minimum brightness are stored in the memory element 400. The minimum brightness is programmable. For example, the content of the memory element 400 can be changed by the user. The outputs of the memory element 400 and the counter 404 are provided to the comparator 406. In an alternate embodiment, the control signals 118 bypass the memory element 400 and are provided directly to the comparator 406.

In one embodiment, the comparator 406 is a digital comparator that compares two digital values. Whenever the output value of the counter 404 is equal to or exceeds the output value of the memory element 400, the output of the comparator 406 is high. The output of the comparator 406 is coupled to the reset input of the flip-flop 408.

The output of the flip-flop 408 is TMIN 308, the pulse duration corresponding to the minimum brightness of the CCFL 114. A set signal (SET) 414 is coupled to the set input of the flip-flop 408. The set signal 414 causes the output of the flip-flop 408 (i.e., TMIN 308) to transition to a high state at the beginning of each period. The output of the flip-flop 408 transitions to the low state when the output of the comparator 406 becomes high. The comparator 406 becomes high when the number of times the sense voltage 126 transitions to a voltage above the reference voltage 410 equals or exceeds the minimum number stored in the memory element 400. Thus, the transition of TMIN 308 from high to low indicates that the minimum number of lamp current cycles to achieve the minimum brightness without flickering is satisfied. A reset signal (RESET) 412 is coupled to the reset input of the counter 404. The reset signal 412 restores the counter 404 to an initial state sometime during the low state of TMIN 308.

Figure 5:
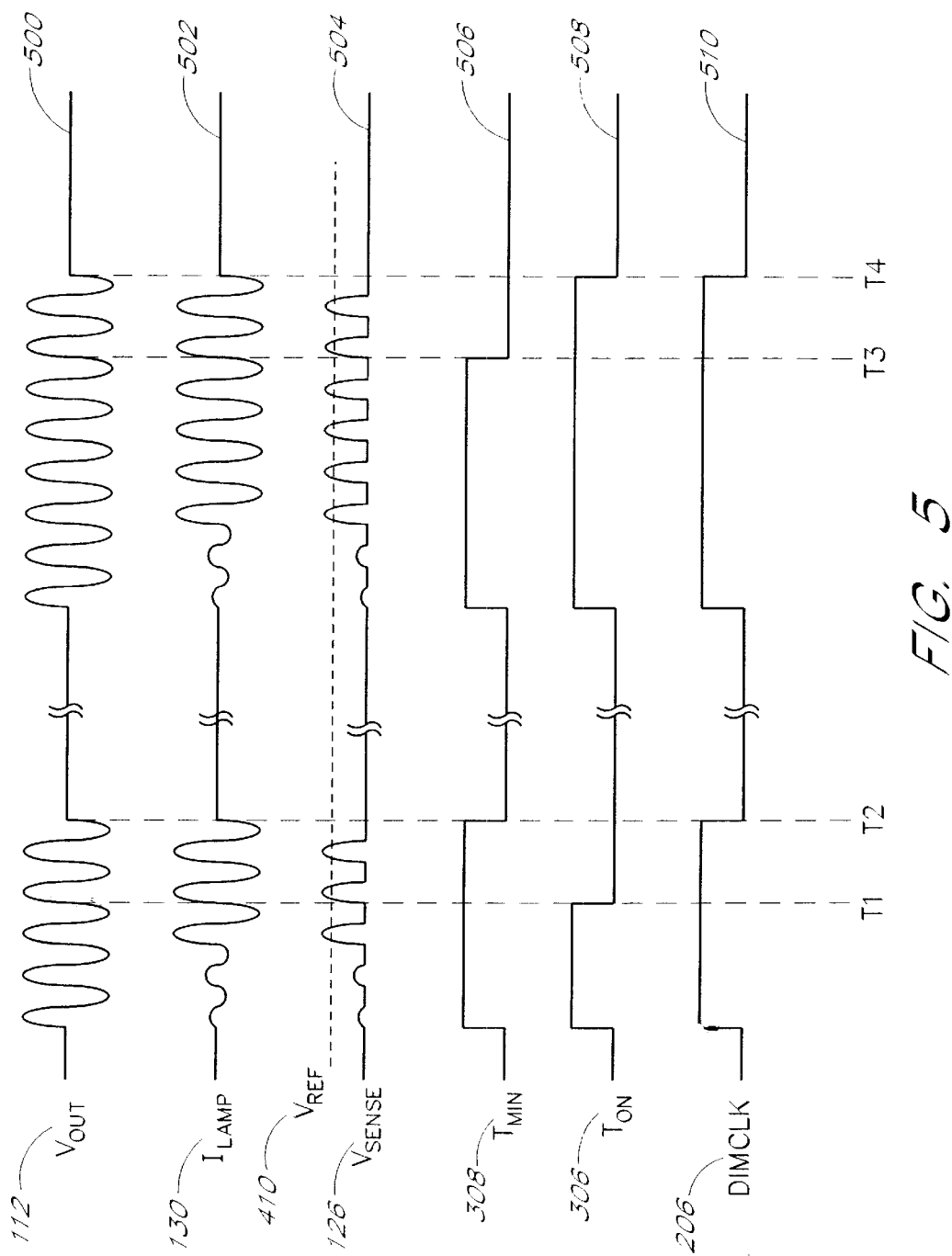
FIG. 5 illustrates timing diagrams which show the waveforms of various signals in the power conversion circuit of FIG. 1.

FIG. 5 illustrates timing diagrams which show the waveforms of various signals in the power conversion circuit of FIG. 1. A graph 500 represents the output voltage 112 provided to the CCFL 114. A graph 502 represents the corresponding lamp current 130 present on the return line of the CCFL 114. A graph 504 represents the sense voltage 126 that is proportional to the lamp current 130. A graph 506 is a logical waveform representing the minimum on-time 308 to avoid flickering or shimmering. A graph 508 is a logical waveform representing the initial on-time 306 derived from the desirable dimming level. A graph 510 is a logical waveform representing the pulse duration signal 206 which is the actual on-time of the CCFL 114.

The output voltage 112 includes periodic bursts of sinusoidal voltages of substantially constant amplitudes. The lamp current 130 includes corresponding periodic bursts of sinusoidal currents of varying amplitudes with some initial cycles in each burst lower than the subsequent cycles in that burst. The sense voltage 126 is a half-wave rectified version of the lamp current 130. The respective logical waveforms of the minimum on-time 308, the initial on-time, and the pulse duration signal 206 transition high at the beginning of each period.

In one embodiment, the minimum on-time 308 required to avoid flickering or shimmering corresponds to a predetermined number of cycles (e.g., three cycles) of the lamp current 130 with sufficient amplitudes. In one case, the initial on-time 306 is set to the minimum of three cycles. At time T1, the output voltage 112 completes three cycles and the initial on-time 306 transitions low. Ideally, the three cycles of the output voltage 112 result in corresponding lamp current cycles with amplitudes above a preset threshold. However, lamp characteristics, LCD mechanical structure, operating temperature and supply voltage variations can cause some of the initial lamp current cycles to fall below the threshold. The horizontal dashed line drawn on graph 504 represents the reference voltage 410 corresponding to the lamp current threshold when the lamp current 130 is converted to the sense voltage 126. The minimum pulse generator circuit 302 counts the cycles of the sense voltage 126 and forces the minimum on-time 308 high until the minimum number of cycles is satisfied. Accordingly, the minimum on-time 308 is high until time T2.

In another case, the initial on-time 306 is set to eight cycles. At time T3, the minimum on-time 308 is satisfied and transitions low. At time T4, the output voltage 112 completes eight cycles and the initial on-time 306 transitions low.

The duty cycle of the pulse duration signal 206 is the greater of the initial on-time duty cycle and the minimum on-time duty cycle. In this manner, the dimming control circuit 200 provides the maximum dimming range under all operating conditions. The initial on-time 306 is determined based on the ideal response of the CCFL 114 and the power conversion circuit. The minimum on-time 308 overrides the initial on-time 306 as necessary to avoid flickering.

Although described above in connection with CCFLs, it should be understood that a similar apparatus and method can be used to drive fluorescent lamps having filaments, neon lamps, and the like.

The presently disclosed embodiments are to be considered in all respect as illustrative and not restrictive. The scope of the invention being indicated by the appended claims, rather than the foregoing description, and all changes which comes within the meaning and range of equivalency of the claims are therefore, intended to be embraced therein.

What is claimed is:

1. A method of controlling the minimum brightness of a fluorescent lamp comprising the acts of:

supplying a sinusoidal voltage to the fluorescent lamp in periodic bursts;

generating a count for each cycle in a sinusoidal current flowing through the fluorescent lamp in response to the sinusoidal voltage, wherein amplitudes of the respective cycles exceed a preset threshold; and adjusting durations of the bursts to achieve a minimum count in each burst.

2. A power conversion circuit for driving a fluorescent lamp at minimum brightness comprising:

means for providing a sinusoidal voltage to the fluorescent lamp during an on-time;

means for counting cycles in a sinusoidal current flowing through the fluorescent lamp in response to the sinusoidal voltage, wherein amplitudes of the respective cycles exceed a preset threshold; and means for adjusting the on-time to achieve a minimum number of the cycles.

3. A method of controlling brightness of a fluorescent lamp comprising the acts of:

supplying a sinusoidal voltage to the fluorescent lamp in periodic bursts;

counting sinusoidal lamp current cycles with respective amplitudes above a preset threshold; and adjusting duty cycles of the periodic bursts to achieve a desired count for each burst.

4. A power conversion circuit for driving a fluorescent lamp, the circuit comprising a controller configured to generate signals with active states and inactive states, wherein durations of the respective active states are equal to or greater than a minimum duration determined by a minimum pulse generator circuit which counts cycles of current flowing through the fluorescent lamp with respective amplitudes above a preset threshold.

5. The power conversion circuit of claim 4, wherein at least one control signal is provided to the controller indicating a control value for comparison with a value representing the cycles counted by the minimum pulse generator circuit.

6. The power conversion circuit of claim 4, wherein the controller comprises:

a pulse width modulation circuit;

an oscillator circuit; and a dimming control circuit.

* * * * *